(12) United States Patent
Murata (10) Patent No.: US 8,363,937 B2
(45) Date of Patent: Jan. 29, 2013

(54) IMAGE PROCESSING DEVICE AND IMAGE PROCESSING METHOD

(75) Inventor: Tsukasa Murata, Yamato (JP)

(73) Assignee: Nikon Corporation, Tokyo (JP)

( * ) Notice: Subject to any disclaimer, the term of this patent is extended or adjusted under 35 U.S.C. 154(b) by 618 days.

(21) Appl. No.: 12/458,964

(22) Filed: Jul. 28, 2009

(65) Prior Publication Data

US 2009/0304277 A1 Dec. 10, 2009

Related U.S. Application Data (63) Continuation of application No. PCT/JP2008/000148, filed on Feb. 5, 2008.

(30) Foreign Application Priority Data

Feb. 7, 2007 (JP) ................................. 2007-028307

(51) Int. Cl.
*G06K 9/00* (2006.01)

(52) U.S. Cl. .................... 382/167; 382/291; 382/300

(58) Field of Classification Search .................. 382/167, 382/291, 300
See application file for complete search history.

(56) References Cited

U.S. PATENT DOCUMENTS

| | | | |
|---|---|---|---|
| 6,323,934 B1 * | 11/2001 | Enomoto | 355/40 |
| 6,437,926 B2 * | 8/2002 | Mori | 359/755 |
| 7,016,118 B2 * | 3/2006 | Wada | 359/676 |
| 2005/0036206 A1 * | 2/2005 | Wada | 359/676 |
| 2005/0179788 A1 * | 8/2005 | Okada et al. | 348/222.1 |
| 2005/0213159 A1 * | 9/2005 | Okada et al. | 358/3.26 |
| 2007/0025636 A1 * | 2/2007 | Furukawa et al. | 382/275 |
| 2008/0062409 A1 | 3/2008 | Utsugi | |

FOREIGN PATENT DOCUMENTS

| | | |
|---|---|---|
| JP | A-2001-036749 | 2/2001 |
| JP | B2-3549413 | 8/2004 |
| JP | A-2005-011269 | 1/2005 |
| JP | A-2005-286482 | 10/2005 |
| WO | WO 2005/117455 A1 | 12/2005 |

\* cited by examiner

*Primary Examiner* — John Strege (74) *Attorney, Agent, or Firm* — Oliff & Berridge, PLC (57) ABSTRACT

A first aberration correcting unit respectively correcting, for the first wavelength and the second wavelength, amount of distortion by a correction value for a chromatic aberration of magnification at the image height, and a first position calculating unit estimating, for respective pixels corresponding to the reference wavelength, amount of displacement of an image location due to a distortion by using a basic equation expressing a relation between amount of distortion at the image height and amount of displacement, and estimating, for respective pixels corresponding to the first wavelength and the second wavelength, amount of displacement of an image location due to a distortion including a correction for the chromatic aberration of magnification by replacing the amount of distortion in the basic equation with the amount of corrected distortion.

7 Claims, 3 Drawing Sheets

IMAGE PROCESSING DEVICE AND IMAGE PROCESSING METHOD

CROSS REFERENCE TO THE RELATED APPLICATIONS

This application is a continuation application of International Application PCT/JP2008/000148, filed Feb. 5, 2008, designating the U.S., and claims the benefit of priority from Japanese Patent Application No. 2007-028307, filed on Feb. 7, 2007, the entire contents of which are incorporated herein by reference.

BACKGROUND

1. Field

The present application relates to an image processing device and an image processing method which correct, for an image captured by a digital camera or the like, aberration that varies depending on an image height such as distortion or chromatic aberration of magnification.

2. Description of the Related Art

A light receiving surface of a two-dimensional image sensor mounted on a digital camera or a color image scanner has arranged therein filters of three colors corresponding to the three primary colors of light, according to the arrangement of pixels in the image sensor. An electrical signal, reflecting the strength of light of the component that transmitted through these color filters, is acquired in each pixel.

In a general two-dimensional image sensor, square pixels are arranged as a two-dimensional array, and color filters corresponding to each of the R, G, and B components are arranged according to the Bayer array. In the Bayer array, filters that transmit light with a wavelength corresponding to the G component reflecting the brightness are successively arranged in a diagonal direction, whereas filters that transmit light with wavelengths corresponding to the R and B components are arranged in every other rows and columns, respectively.

With an image sensor having color filters arranged therein according to the above-mentioned Bayer array, only the strength of the component corresponding to the transmission wavelength of the color filter corresponding to the pixel data of each pixel is indicated. Therefore, the color at the position of each pixel of the image formed on the image sensor is obtained by interpolating the surrounding pixel data for each of the R, G, and B components.

The interpolation process of obtaining, from a Bayer image acquired by the image sensor having color filters of the Bayer array, image data having all the R, G, and B components indicating the color at the position of each pixel is referred to as a deBayer process.

Conventionally, in most cases where a Bayer image is acquired by a two-dimensional image sensor, the above-mentioned deBayer process is first performed to obtain image data having all the R, G, and B components for each pixel, and thereafter a variety of image processes such as correcting distortion or chromatic aberration of magnification are performed (See Patent Document 1: Japanese Patent No. 3549413).

Here, when performing correction of distortion and chromatic aberration of magnification for the image data after the deBayer process, the amount of computation becomes enormous because position calculation and interpolation for the correcting process are performed for each of the R, G, and B components in image data of a whole frame.

A technique described in the Patent Document 1 calculates the amount of correction for the R and B components at the position of interest by adding the component of chromatic aberration of magnification for the R and B components to the component of the distortion obtained for the G component at the image height corresponding to the position of each pixel. However, in such a process, the merit of performing the aberration correcting process at the Bayer image stage cannot be fully utilized. That is, simple application of the technique described in the Patent Document 1 requires, also in the position calculation for the R pixels and B pixels, calculation of the amount of distortion for the G component at these pixel positions.

SUMMARY

It is a proposition of the present embodiment to provide an image processing device and an image processing method which collectively correct, for image data acquired using a two-dimensional image sensor, aberration that depends on the image height including chromatic aberration of magnification and distortion.

The above-mentioned proposition is achieved by an image processing device configured as follows.

In an image processing device which performs a process of correcting aberration that depends on the image height on image data expressing a color of each pixel by a pixel data component for a reference wavelength being predetermined and by pixel data components for a first wavelength and a second wavelength that are different from the reference wavelength, a first aberration correcting unit respectively corrects, for the first wavelength and the second wavelength, amount of distortion at the image height by using a correction value corresponding to a chromatic aberration of magnification at the image height. A first position calculating unit estimates, for respective pixels corresponding to the reference wavelength, amount of displacement of an image location due to a distortion by using a basic equation expressing a relation between amount of distortion at the image height and amount of displacement, and which estimates, for respective pixels corresponding to the first wavelength and the second wavelength, amount of displacement of an image location due to a distortion including a correction of chromatic aberration of magnification by replacing the amount of distortion in the basic equation with the amount of distortion corrected by the first aberration correcting unit for the first wavelength and the second wavelength.

The above-mentioned proposition is achieved by an image processing device configured as follows.

In an image processing device which performs a process of correcting aberration that depends on an image height on a Bayer image acquired by a two-dimensional image sensor having square pixels arranged in a two-dimensional manner and filters corresponding to a reference wavelength successively arranged in a diagonal direction, a second aberration correcting unit corrects amount of distortion for each pixel which is arranged with one of filters corresponding to a first wavelength and a second wavelength that are different from the reference wavelength by using a correction value which corresponds to an image height of the pixel and which also depends on one of the first wavelength and the second wavelength corresponding to the filters arranged corresponding to the pixel. A second position calculating unit estimates, for respective pixels corresponding to the reference wavelength, amount of displacement of an image location due to a distortion by using a basic equation expressing a relation between amount of distortion at the image height and amount of displacement, and which estimates, for respective pixels corresponding to the first wavelength and the second wavelength, amount of displacement of an image location due to a distortion including a correction of chromatic aberration of magnification by replacing the amount of distortion in the basic equation with the amount of distortion corrected by the second aberration correcting unit for the first wavelength and the second wavelength.

The above-mentioned proposition is achieved by an image processing device configured as follows.

In an image processing device which performs a process of correcting aberration that depends on an image height on image data expressing a color of each pixel by a pixel data component for a reference wavelength being predetermined and by pixel data components for a first wavelength and a second wavelength that are different from the reference wavelength, a first rate correcting unit respectively corrects, for the first wavelength and the second wavelength, a rate of magnification conversion associated with a distortion correction by using a correction value corresponding to a chromatic aberration of magnification at the image height. A third position calculating unit estimates, for respective pixels corresponding to the reference wavelength, amount of displacement of an image location due to a distortion by using a basic equation expressing a relation between amount of distortion at the image height and amount of displacement with a rate of magnification conversion for the reference wavelength, and which estimates, for respective pixels corresponding to the first wavelength and the second wavelength, amount of displacement of an image location due to a distortion including a correction of chromatic aberration of magnification by replacing the rate of magnification conversion for the reference wavelength in the basic equation with the rate of magnification conversion corrected by the first rate correcting unit for the first wavelength and the second wavelength.

The above-mentioned proposition is achieved by an image processing device configured as follows.

In an image processing device which performs a process of correcting aberration that depends on an image height on a Bayer image acquired by a two-dimensional image sensor having square pixels arranged in a two-dimensional manner and filters corresponding to a reference wavelength successively arranged in a diagonal direction, a second rate correcting unit corrects a rate of magnification conversion associated with a distortion correction for each pixel which is arranged with one of filters corresponding to a first wavelength and a second wavelength that are different from the reference wavelength by using a correction value which corresponds to a chromatic aberration of magnification with regard to an image height of the pixel and which also depends on one of the first wavelength and the second wavelength corresponding to the filters arranged corresponding to the pixel. A fourth position calculating unit estimates, for respective pixels corresponding to the reference wavelength, amount of displacement of an image location due to a distortion by using a basic equation expressing a relation between amount of distortion at the image height and amount of displacement with a rate of magnification conversion for the reference wavelength, and which estimates, for respective pixels corresponding to the first wavelength and the second wavelength, amount of displacement of an image location due to a distortion including a correction of chromatic aberration of magnification by replacing the rate of magnification conversion for the reference wavelength in the basic equation with the rate of magnification conversion corrected by the second rate correcting unit for the first wavelength and the second wavelength.

The above-mentioned proposition is achieved by an image processing method arranged as follows.

In an image processing method which performs a process of correcting aberration that depends on an image height on image data expressing a color of each pixel by a pixel data component for a reference wavelength being predetermined and by pixel data components for a first wavelength and a second wavelength that are different from the reference wavelength, a first aberration correcting procedure respectively corrects, for the first wavelength and the second wavelength, amount of distortion at the image height by using a correction value corresponding to a chromatic aberration of magnification at the image height. A first position calculating procedure estimates, for respective pixels corresponding to the reference wavelength, amount of displacement of an image location due to a distortion by using a basic equation expressing a relation between amount of distortion at the image height and amount of displacement, and which estimates, for respective pixels corresponding to the first wavelength and the second wavelength, amount of displacement of the image location due to a distortion including a correction of chromatic aberration of magnification by replacing the amount of distortion in the basic equation with the amount of distortion corrected by the first aberration correcting procedure for the first wavelength and the second wavelength.

The above-mentioned proposition is achieved by an image processing method arranged as follows.

In an image processing method which performs a process of correcting aberration that depends on an image height on a Bayer image acquired by a two-dimensional image sensor having square pixels arranged in a two-dimensional manner and filters corresponding to a reference wavelength successively arranged in a diagonal direction, a second aberration correcting procedure corrects amount of distortion for each pixel which is arranged with one of filters corresponding to a first wavelength and a second wavelength that are different from the reference wavelength by using a correction value which corresponds to an image height of the pixel and which also depends on one of the first wavelength and the second wavelength corresponding to the filters arranged corresponding to the pixel. A second position calculating procedure estimates, for respective pixels corresponding to the reference wavelength, amount of displacement of an image location due to a distortion by using a basic equation expressing a relation between amount of distortion at the image height and amount of displacement, and which estimates, for respective pixels corresponding to the first wavelength and the second wavelength, amount of displacement of an image location due to a distortion including a correction of chromatic aberration of magnification by replacing the amount of distortion in the basic equation with the amount of distortion corrected by the second aberration correcting procedure for the first wavelength and the second wavelength.

The above-mentioned proposition is achieved by an image processing method arranged as follows.

In an image processing method which performs a process of correcting aberration that depends on an image height on image data expressing a color of each pixel by a pixel data component for a reference wavelength being predetermined and by pixel data components for a first wavelength and a second wavelength that are different from the reference wavelength, a first rate correcting procedure respectively corrects, for the first wavelength and the second wavelength, a rate of magnification conversion associated with a distortion correction by using a correction value corresponding to a chromatic aberration of magnification at the image height. A third position calculating procedure estimates, for respective pixels corresponding to the reference wavelength, amount of displacement of an image location due to a distortion by using a basic equation expressing a relation between amount of distortion at the image height and amount of displacement with a rate of magnification conversion for the reference wavelength, and which estimates, for respective pixels corresponding to the first wavelength and the second wavelength, amount of displacement of an image location due to a distortion including a correction of chromatic aberration of magnification by replacing the rate of magnification conversion for the reference wavelength in the basic equation with the rate of magnification conversion corrected by the first rate correcting procedure for the first wavelength and the second wavelength.

The above-mentioned proposition is achieved by an image processing method arranged as follows.

In an image processing method which performs a process of correcting aberration that depends on an image height on a Bayer image acquired by a two-dimensional image sensor having square pixels arranged in a two-dimensional manner and filters corresponding to a reference wavelength successively arranged in a diagonal direction, a second rate correcting procedure corrects a rate of magnification conversion associated with a distortion correction for each pixel which is arranged with one of filters corresponding to a first wavelength and a second wavelength that are different from the reference wavelength by using a correction value which corresponds to a chromatic aberration of magnification with regard to an image height of the pixel and which also depends on one of the first wavelength and the second wavelength corresponding to the filters arranged corresponding to the pixel. A fourth position calculating procedure estimates, for respective pixels corresponding to the reference wavelength, amount of displacement of an image location due to a distortion by using a basic equation expressing a relation between amount of distortion at the image height and amount of displacement with a rate of magnification conversion for the reference wavelength, and which estimates, for respective pixels corresponding to the first wavelength and the second wavelength, amount of displacement of an image location due to a distortion including a correction of chromatic aberration of magnification by replacing the rate of magnification conversion for the reference wavelength in the basic equation with the rate of magnification conversion corrected by the second rate correcting procedure for the first wavelength and the second wavelength.

DETAILED DESCRIPTION OF THE EMBODIMENTS

Chromatic aberration of magnification can be regarded as color drift at the image height between the G component, which is the reference wavelength, and the R and B components. Accordingly, a technique is proposed to reduce the amount of computation required to correct the chromatic aberration of magnification by obtaining, at the stage of the Bayer image before interpolation, pixel data at the position of each of the R pixels and B pixels distributed in the Bayer image using linear interpolation to correct chromatic aberration of magnification.

In order to reduce the amount of computation required for the aberration correcting process, a technique is considered effective which collectively corrects aberration that depends on the image height at the stage of the Bayer image. The aberration with the image height dependence includes distortion and chromatic aberration of magnification.

In the following, an embodiment of the present invention will be described in detail based on the drawings.

Figure 1:
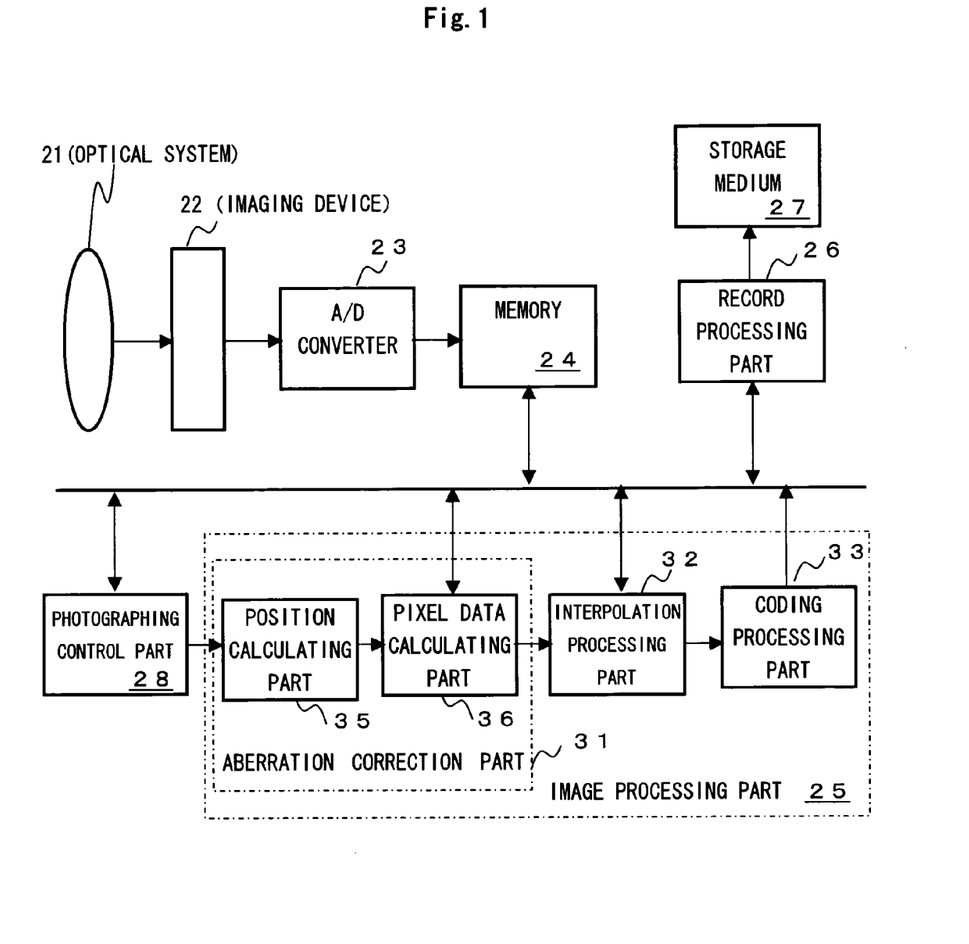
FIG. 1 illustrates an embodiment of an image processing device.

FIG. 1 illustrates an embodiment of an image processing device according to the present invention.

In the digital camera shown in FIG. 1, the light which has formed an image on an imaging device 22 by an optical shooting system 21 during image capturing is converted by the imaging device 22 into an electrical signal according to its strength. The electrical signal is converted into digital data by an analog/digital (A/D) converter 23 and stored in a memory 24.

The memory 24 shown in FIG. 1 is connected to an image processing part 25, a record processing part 26, and a photographing control part 28 via a bus. The image processing part 25 performs an image processing including a coding process on the digital data stored in the memory 24 as described above. The compressed image data obtained as a result of the image processing is passed to the record processing part 26 via a bus and recorded on a storage medium 27. In addition, the operation of each of these parts, an unshown autofocus control part and an electronic flash drive circuit which drives the light source of the electronic flash are controlled by the photographing control part 28 according to instructions entered via an operation panel (not shown) by the user.

As the imaging device 22 shown in FIG. 1, there is provided a two-dimensional CCD image sensor having color filters arranged according to the Bayer array. In this case, Bayer image data is obtained by the analog/digital converter 23, and the Bayer image data is subjected to a process by the image processing part 25 via the memory 24.

In the image processing part 25, an aberration correction part 31 performs a process of correcting the distortion as well as a magnification converting process associated therewith, prior to the deBayer process by an interpolation processing part 32. Subsequently, the interpolation processing part 32 performs a process of generating image data having all the R, G, and B components for each of the pixels included in the above-mentioned two-dimensional image sensor, from the Bayer image. In addition, the image data obtained by the interpolation processing part 32 is compressed and coded in a coding processing part 33 and passed to the record processing part 26.

When correcting distortion by the aberration correction part 31 shown in FIG. 1, for example, a position calculating part 35 first calculates the coordinate position to correct distortion. Subsequently, a pixel data calculating part 36 obtains the pixel data of the coordinate position obtained by the position calculating part 35.

The coordinates $(x_{CCD}, y_{CCD})$ are calculated by the position calculation for correcting distortion on the arrangement of pixels in the two-dimensional CCD image sensor, using equation (1). Equation (1) indicates the relation between the coordinate values $(x_{CCD}, y_{CCD})$ indicating the position in a coordinate system expressed according to the arrangement of the pixels on the two-dimensional CCD image sensor and the coordinates $(x_o, y_o)$ on the distortion-corrected image. The coordinates $(x_{CCD}, y_{CCD})$ are expressed in equation (1) using the coordinate values $(x_C, y_C)$ indicating the center Sc of the two-dimensional image sensor, the amount of distortion D(r) relating to the normalized image height r, and the rate of magnification conversion $D_\alpha$ for trimming the image after distortion correction.

$$x_{CCD} = \frac{100 + D(r)}{100 + D_\alpha}(x_o - x_c) + x_c \qquad (1)$$

$$y_{CCD} = \frac{100 + D(r)}{100 + D_\alpha}(y_o - y_c) + y_c$$

Here, the light of the R component having a longer wavelength than the G component which is the reference wavelength and the light of the B component having a shorter wavelength, on the contrary, travel respective optical paths which are slightly different from that of the light of the G component to form an image, in the optical shooting system. Therefore, with regard to the R pixels and the B pixels included in the Bayer image, it is necessary to correct chromatic aberration of magnification, in addition to the above-mentioned distortion.

This chromatic aberration of magnification can be regarded as the difference between the rate of magnification conversion $D_\alpha$ applied to the G pixels and the rate of magnification conversion that should be applied in the position calculation to correct distortion for the R pixels and the B pixels.

Therefore, a position calculating equation for correcting distortion with regard to the R and B components can be obtained as shown in equations (2) and (3), by correcting the rate of magnification conversion of equation (1) using $\delta D_R(r)$ and $\delta D_B(r)$ indicating the variation of the rate of magnification conversion due to chromatic aberration of magnification for the R and B components at the normalized image height r.

$$x_{CCD} = \frac{100 + D(r)}{100 + D_\alpha + \delta D_R(r)}(x_o - x_c) + x_c \qquad (2)$$

$$y_{CCD} = \frac{100 + D(r)}{100 + D_\alpha + \delta D_R(r)}(y_o - y_c) + y_c$$

$$x_{CCD} = \frac{100 + D(r)}{100 + D_\alpha + \delta D_B(r)}(x_o - x_c) + x_c \qquad (3)$$

$$y_{CCD} = \frac{100 + D(r)}{100 + D_\alpha + \delta D_B(r)}(y_o - y_c) + y_c$$

The position calculating part 35 shown in FIG. 1 applies equation (1) to the G pixels included in the Bayer image and equations (2) and (3) to R and B pixels, respectively, and performs position calculation for respective pixels. In this occasion, the position calculating part 35 obtains the above-mentioned amount of distortion D(r) and the variations $\delta D_R(r)$ and $\delta D_B(r)$ of the rate of magnification conversion for the normalized image height r with regard to the pixels of interest, based on the design data with regard to the optical shooting system and a shooting condition (focal distance, focus position, diaphragm, etc) passed from the photographing control part 28, and applies them to the position calculating process.

In the coordinate values ($x_{CCD}$, $y_{CCD}$) obtained in this manner for the R and B pixels, $\delta D_R(r)$ and $\delta D_B(r)$ indicating the variation of the rate of magnification conversion due to chromatic aberration of magnification are properly reflected.

Then, the coordinate values ($x_{CCD}$, $y_{CCD}$) calculated by the position calculating part 35 are passed to the pixel data calculating part 36 shown in FIG. 1. The pixel data calculating part 36 performs interpolation using the pixel data of the corresponding component located nearby a position shown by the coordinate values ($x_{CCD}$, $y_{CCD}$). In this manner, pixel data with corrected aberration that depends on the image height can be obtained with a high precision.

The pixel data calculating part 36 obtains the corrected pixel data for each of the R, G, and B pixels included in the Bayer image, and rewrites the pixel data corresponding to the Bayer image stored in the memory 24, using the corrected pixel data. Therefore, a Bayer image having distortion and chromatic aberration of magnification collectively corrected can be obtained.

The Bayer image having distortion and chromatic aberration of magnification corrected in this manner is subjected to the deBayer process by the interpolation processing part 32. In this manner, image data having distortion and chromatic aberration of magnification corrected at a high speed can be obtained.

In a Bayer image, the total sum of the number of R, G, and B pixels is the number of pixels of the two-dimensional image sensor. Therefore, in the case of correcting distortion and chromatic aberration of magnification according to the above-mentioned technique independently for the R, G, and B pixels at the stage of a Bayer image, the number of pixels to be subjected to the processes of position calculation and pixel data calculation is substantially reduced compared with the case of performing calculations for the image data having all the R, G, and B components. Accordingly, the amount of computation can be suppressed.

In addition, since $\delta D_R(r)$ and $\delta D_B(r)$ indicating the variation of rate of magnification conversion due to chromatic aberration of magnification is sufficiently smaller than the amount of distortion D(r), the above-mentioned equations (2) and (3) can be approximated such as equations (6) and (7). Here, in equations (6) and (7), the amount of distortion $D_R(r)$ and $D_B(r)$ including chromatic aberration of magnification are expressed by equations (4) and (5) for the R and B components.

$$D_R(r) = D(r) - \frac{100}{100 + D_\alpha}\delta D_R(r) - \frac{\delta D_R(r)}{100 + D_\alpha}D(r) \qquad (4)$$

$$\cong D(r) - \frac{100}{100 + D_\alpha}\delta D_R(r)$$

$$D_B(r) = D(r) - \frac{100}{100 + D_\alpha}\delta D_B(r) - \frac{\delta D_B(r)}{100 + D_\alpha}D(r) \qquad (5)$$

$$\cong D(r) - \frac{100}{100 + D_\alpha}\delta D_B(r)$$

$$\begin{aligned} x_{CCD} &= \frac{100 + D(r)}{100 + D_\alpha + \delta D_R(r)}(x_o - x_c) + x_c \\ &= \frac{100 + D_\alpha}{100 + D_\alpha + \delta D_R(r)} \cdot \frac{100 + D(r)}{100 + D_\alpha}(x_o - x_c) + x_c \\ &\cong \left(1 - \frac{\delta D_R(r)}{100 + D_\alpha}\right)\frac{100 + D(r)}{100 + D_\alpha}(x_o - x_c) + x_c \\ &= \frac{100 + D_R(r)}{100 + D_\alpha}(x_o - x_c) + x_c \end{aligned} \qquad (6)$$

$$\begin{aligned} y_{CCD} &\cong \left(1 - \frac{\delta D_R(r)}{100 + D_\alpha}\right)\frac{100 + D(r)}{100 + D_\alpha}(y_o - y_c) + y_c \\ &= \frac{100 + D_R(r)}{100 + D_\alpha}(y_o - y_c) + y_c \end{aligned}$$

-continued $$x_{CCD} = \frac{100 + D(r)}{100 + D_\alpha + \delta D_B(r)}(x_o - x_c) + x_c \quad (7)$$

$$= \frac{100 + D_\alpha}{100 + D_\alpha + \delta D_B(r)} \frac{100 + D(r)}{100 + D_\alpha}(x_o - x_c) + x_c$$

$$\cong \left(1 - \frac{\delta D_B(r)}{100 + D_\alpha}\right) \frac{100 + D(r)}{100 + D_\alpha}(x_o - x_c) + x_c$$

$$\equiv \frac{100 + D_B(r)}{100 + D_\alpha}(x_o - x_c) + x_c$$

$$y_{CCD} \cong \left(1 - \frac{\delta D_B(r)}{100 + D_\alpha}\right) \frac{100 + D(r)}{100 + D_\alpha}(y_o - y_c) + y_c$$

$$\equiv \frac{100 + D_B(r)}{100 + D_\alpha}(y_o - y_c) + y_c$$

As indicated in equations (4) and (5), the amount of distortion $D_R(r)$ and $D_B(r)$ including chromatic aberration of magnification for the R and B components, can be regarded as the values of the distortion corrected respectively using the G component with $\delta D_R(r)$ and $\delta D_B(r)$ indicating the variation of rate of magnification conversion due to chromatic aberration of magnification.

In other words, distortion $D(r)$ of equation (1), that is the basic equation, can be replaced by the amount of distortion $D_R(r)$ and $D_B(r)$ including chromatic aberration of magnification, which are respectively expressed for the R and B components using $\delta D_R(r)$ and $\delta D_B(r)$ indicating the variation of rate of magnification conversion due to chromatic aberration of magnification. By performing approximate calculation using equations (6) and (7) obtained by applying this replacement, the position calculating part 35 can perform position calculation related to aberration that depends on the image height including chromatic aberration of magnification, and obtain sufficiently precise coordinate values.

Figure 2:
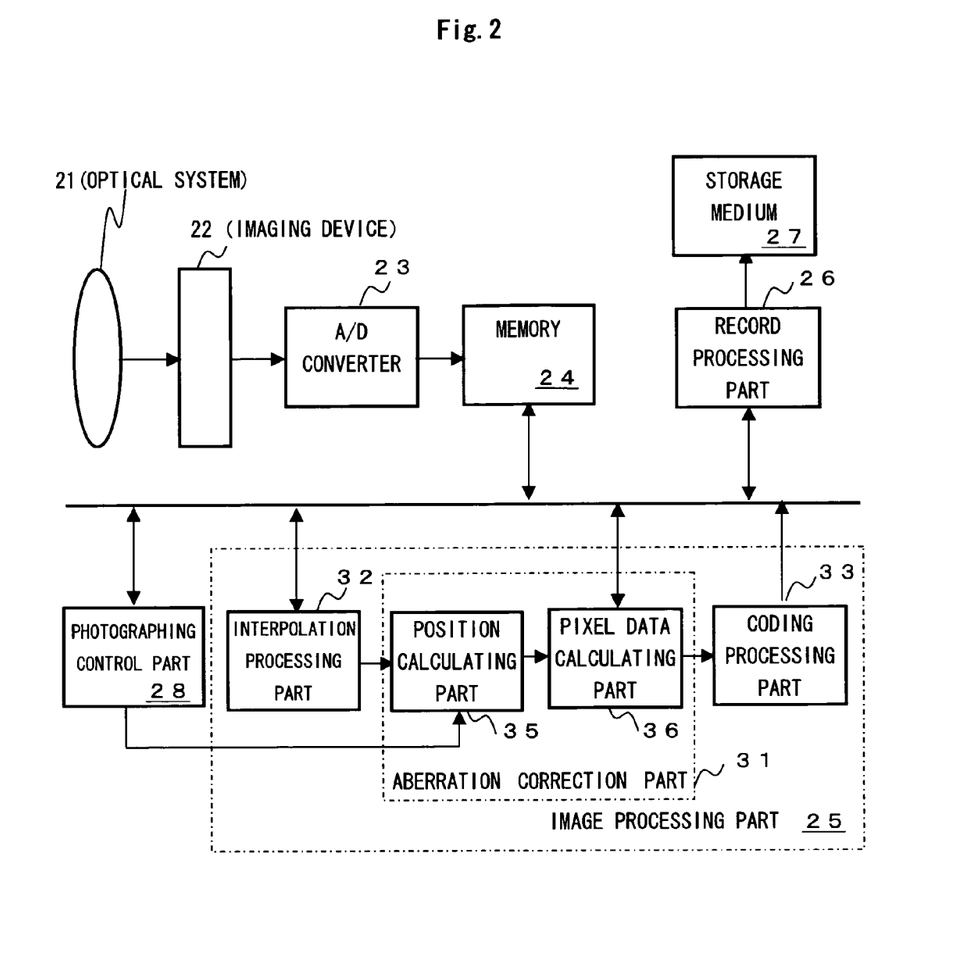
FIG. 2 illustrates another embodiment of the image processing device.

Here, as shown in FIG. 2, it is also possible to subject the image data having all the R, G, and B components to the processes of the position calculating part 35 and the pixel data calculating part 36 after completion of the deBayer process by the interpolation processing part 32, and correct distortion and chromatic aberration of magnification, for each of the R, G, and B pixel data of a whole frame.

Figure 3:
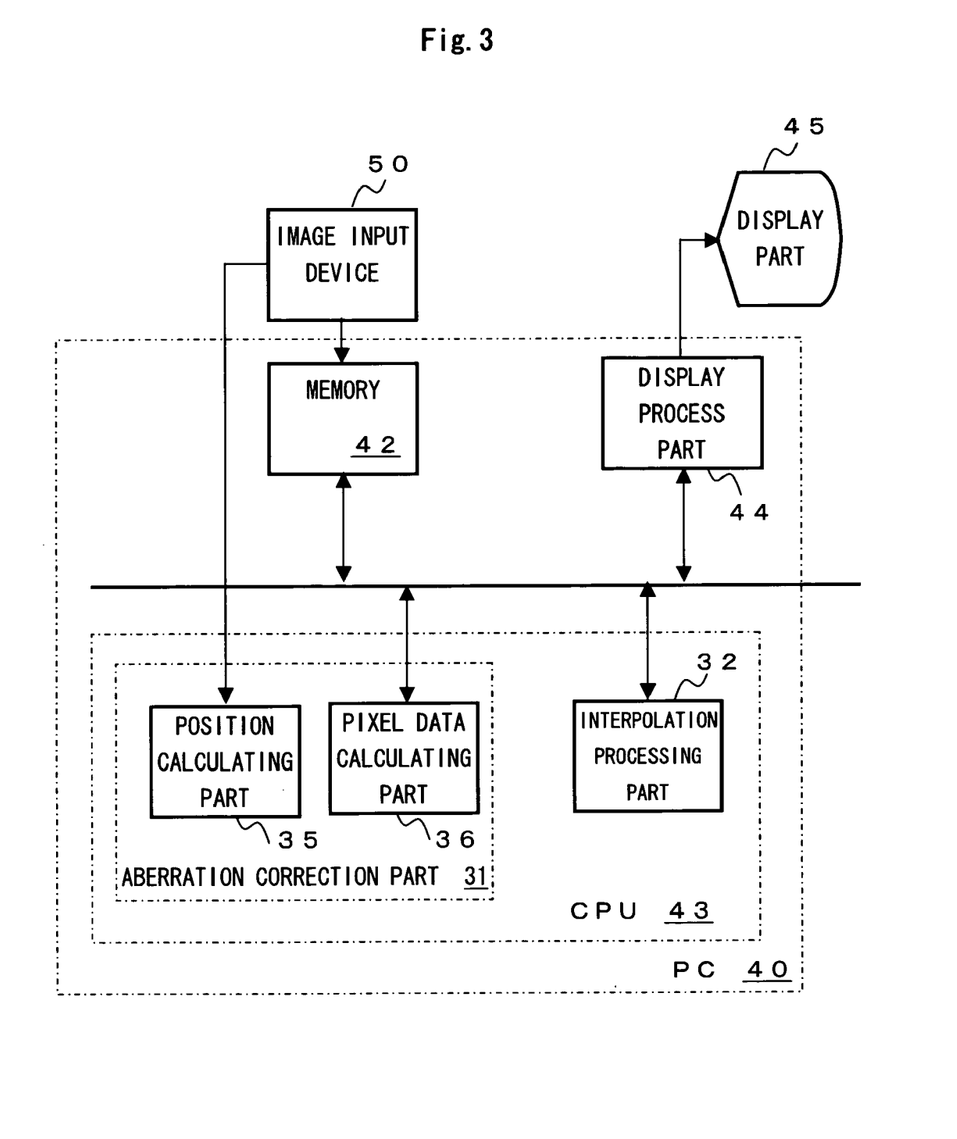
FIG. 3 illustrates another embodiment of the image processing device.

In addition, as shown in FIG. 3, it is also possible to realize the aberration correction part 31 by running the image processing software for the process to be performed in the position calculating part 35 and the pixel data calculating part 36 on the CPU 41 of the personal computer 40.

An image input device 50 shown in FIG. 3 may be a digital camera and a color scanner with a function of outputting the acquired Bayer image, including, for example, a two-dimensional CCD image sensor having color filters arranged therein according to the Bayer array. The Bayer image passed from the image input unit 50 is stored in the memory 42 of the personal computer 40.

The aberration correction part 31 shown in FIG. 3 receives information relating to distortion and chromatic aberration of magnification from the image input unit 50 and, based on the information, performs aberration correction as described in the above-mentioned embodiment with regard to the digital camera. Then, the pixel data calculating part 36 calculates the pixel data of each color component included in the Bayer image, and replaces the Bayer image stored in the memory 42 using the obtained pixel data. In this manner, a Bayer image is acquired with distortion and chromatic aberration of magnification having been corrected.

The distortion corrected Bayer image is read out from the memory 42 by the interpolation processing part 32 shown in FIG. 3, and image data having all the R, G, and B components included therein for all the pixels of the two-dimensional CCD image sensor provided in the image input unit 50 can be acquired by the deBayer process performed by the interpolation processing part 32.

The image data obtained in this manner is subjected to a display process by a display process part 44 and a display part 45, and further subjected to a variety of image processing.

The image processing device illustrated in FIG. 3 combines together a function provided in a digital camera for outputting a Bayer image with a high processing ability of a personal computer. Therefore, by storing more detailed information in the personal computer 40 about distortion with regard to an optical system provided in the image input unit 50, for example, it is possible to realize a highly precise aberration correction using the detailed information.

The image processing device disclosed above can be incorporated in an image input device such as a digital camera or a color scanner to collectively correct, with a high precision, aberration that depends on the image height including distortion and chromatic aberration of magnification.

In addition, according to the above-mentioned image processing device and an image processing method, it becomes possible to calculate, in a single process, the amount of displacement of the image location due to aberration that depends on the image height including chromatic aberration of magnification and distortion. In addition, each of the color components included in the image data can be calculated independently.

Particularly, by realizing collective correction of chromatic aberration of magnification and distortion at the Bayer image stage, it is possible to speed up the aberration correcting process.

Therefore, the present invention is significantly effective in the field of image input devices such as a digital camera or a color scanner, as well as in the field of image processing devices which perform a variety of processes on image data obtained by an image input unit.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device performing a process of correcting aberration which depends on an image height on image data expressing a color of each pixel by a pixel data component for a reference wavelength being predetermined and by pixel data components for a first wavelength and a second wavelength, the first wavelength and the second wavelength being different from the reference wavelength, the image processing device comprising:

an aberration correcting unit which obtains (1) an amount of distortion including a chromatic aberration of magnification for the first wavelength by applying, to an amount of distortion of the reference wavelength at the image height, a correction value calculated based on a difference of a rate of magnification conversion due to chromatic aberration of magnification which corresponds to the image height and the first wavelength, and (2) an amount of distortion including a chromatic aberration of magnification for the second wavelength by applying, to the amount of distortion of the reference wavelength at the image height, a correction value calculated based on a difference of a rate of magnification conversion due to chromatic aberration of magnification which corresponds to the image height and the second wavelength; and a position calculating unit estimating, for respective pixels corresponding to the reference wavelength, an amount of displacement of an image location due to a distortion by using an equation expressing a relationship between an amount of distortion at the image height and the amount of displacement, and estimating, for respective pixels corresponding to the first wavelength and the second wavelength, an amount of displacement of an image location due to a distortion including a correction of chromatic aberration of magnification by replacing the amount of distortion in the equation with the amount of distortion corrected by the aberration correcting unit for the first wavelength and the second wavelength.

2. An image processing device performing a process of correcting aberration which depends on an image height on a Bayer image acquired by a two-dimensional image sensor having square pixels arranged in a two-dimensional manner and filters corresponding to a reference wavelength successively arranged in a diagonal direction, the image processing device comprising:

an aberration correcting unit which obtains (1) an amount of distortion including a chromatic aberration of magnification for each pixel which is arranged with one of filters corresponding to a first wavelength by applying, to an amount of distortion of the reference wavelength at the image height, a correction value calculated based on a difference of a rate of magnification conversion due to chromatic aberration of magnification which corresponds to the image height and the first wavelength, and (2) an amount of distortion including a chromatic aberration of magnification for a second wavelength corresponding to the filters arranged corresponding to the pixel by applying, to the amount of distortion of the reference wavelength at the image height, a correction value calculated based on a difference of a rate of magnification conversion due to chromatic aberration of magnification which corresponds to the image height and the second wavelength, the first wavelength and the second wavelength being different from the reference wavelength; and a position calculating unit estimating, for respective pixels corresponding to the reference wavelength, an amount of displacement of an image location due to a distortion by using an equation expressing a relationship between an amount of distortion at the image height and the amount of displacement, and estimating, for respective pixels corresponding to the first wavelength and the second wavelength, an amount of displacement of an image location due to a distortion including a correction of chromatic aberration of magnification by replacing the amount of distortion in the equation with the amount of distortion corrected by the aberration correcting unit for the first wavelength and the second wavelength.

3. An image processing device performing a process of correcting aberration which depends on an image height on an image acquired by a two-dimensional image sensor having rectangular pixels arranged in a two-dimensional manner with filters arranged at each pixel corresponding to one of a reference wavelength, a first wavelength, and a second wavelength, the first wavelength and the second wavelength being different from the reference wavelength, the image processing device comprising:

an aberration correcting unit which obtains (1) an amount of distortion including a chromatic aberration of magnification for each pixel which is arranged with one of filters corresponding to the first wavelength by applying, to an amount of distortion of the reference wavelength at the image height, a correction value calculated based on a difference of a rate of magnification conversion due to chromatic aberration of magnification which corresponds to the image height and the first wavelength, and (2) an amount of distortion including a chromatic aberration of magnification for the second wavelength corresponding to the filters arranged corresponding to the pixel by applying, to the amount of distortion of the reference wavelength at the image height, a correction value calculated based on a difference of a rate of magnification conversion due to chromatic aberration of magnification which corresponds to the image height and the second wavelength; and a position calculating unit estimating, for respective pixels corresponding to the reference wavelength, an amount of displacement of an image location due to a distortion by using an equation expressing a relationship between an amount of distortion at the image height and the amount of displacement, and estimating, for respective pixels corresponding to the first wavelength and the second wavelength, an amount of displacement of an image location due to a distortion including a correction of chromatic aberration of magnification by replacing the amount of distortion in the equation with the amount of distortion corrected by the aberration correcting unit for the first wavelength and the second wavelength.

4. An image processing method performing a process of correcting aberration which depends on an image height on image data expressing a color of each pixel by a pixel data component for a reference wavelength being predetermined and by pixel data components for a first wavelength and a second wavelength, the first wavelength and the second wavelength being different from the reference wavelength, the image processing method comprising:

obtaining, by an aberration correcting procedure, (1) an amount of distortion including a chromatic aberration of magnification for the first wavelength by applying, to an amount of distortion of the reference wavelength at the image height, a correction value calculated based on a difference of a rate of magnification conversion due to chromatic aberration of magnification which corresponds to the image height and the first wavelength, and (2) an amount of distortion including a chromatic aberration of magnification for the second wavelength by applying, to the amount of distortion of the reference wavelength at the image height, a correction value calculated based on a difference of a rate of magnification conversion due to chromatic aberration of magnification which corresponds to the image height and the second wavelength; and estimating, by a position calculating procedure, for respective pixels corresponding to the reference wavelength, an amount of displacement of an image location due to a distortion by using an equation expressing a relationship between an amount of distortion at the image height and the amount of displacement, and estimating, for respective pixels corresponding to the first wavelength and the second wavelength, an amount of displacement of the image location due to a distortion including a correction of chromatic aberration of magnification by replacing the amount of distortion in the equation with the amount of distortion corrected by the aberration correcting procedure for the first wavelength and the second wavelength.

5. An image processing method performing a process of correcting aberration which depends on an image height on a Bayer image acquired by a two-dimensional image sensor having square pixels arranged in a two-dimensional manner and filters corresponding to a reference wavelength successively arranged in a diagonal direction, the image processing method comprising:

obtaining, by an aberration correcting procedure, (1) an amount of distortion including a chromatic aberration of magnification for each pixel which is arranged with one of filters corresponding to a first wavelength by applying, to an amount of distortion of the reference wavelength at the image height, a correction value calculated based on a difference of a rate of magnification conversion due to chromatic aberration of magnification which corresponds to the image height and the first wavelength, and (2) an amount of distortion including a chromatic aberration of magnification for a second wavelength corresponding to the filters arranged corresponding to the pixel by applying, to the amount of distortion of the reference wavelength at the image height, a correction value calculated based on a difference of a rate of magnification conversion due to chromatic aberration of magnification which corresponding to the images height and the second wavelength, the first wavelength and the second wavelength being different from the reference wavelength; and estimating, by a position calculating procedure, for respective pixels corresponding to the reference wavelength, an amount of displacement of an image location due to a distortion by using an equation expressing a relationship between an amount of distortion at the image height and the amount of displacement, and estimating, for respective pixels corresponding to the first wavelength and the second wavelength, an amount of displacement of an image location due to a distortion including a correction of chromatic aberration of magnification by replacing the amount of distortion in the equation with the amount of distortion corrected by the aberration correcting procedure for the first wavelength and the second wavelength.

6. An image processing method performing a process of correcting aberration which depends on an image height on an image acquired by a two-dimensional image sensor having rectangular pixels arranged in a two-dimensional manner with filters arranged at each pixel corresponding to one of a reference wavelength, a first wavelength, and a second wavelength, the first wavelength and the second wavelength being different from the reference wavelength, the image processing method comprising:

obtaining, by an aberration correcting procedure, (1) an amount of distortion including a chromatic aberration of magnification for each pixel which is arranged with one of filters corresponding to the first wavelength by applying, to an amount of distortion of the reference wavelength at the image height, a correction value calculated based on a difference a rate of magnification conversion due to chromatic aberration of magnification which corresponds to the image height and the first wavelength, and (2) an amount of distortion including a chromatic aberration of magnification for the second wavelength corresponding to the filters arranged corresponding to the pixel by applying, to the amount of distortion of the reference wavelength at the image height, a correction value calculated based on a difference of a rate of magnification aversion due to chromatic aberration of magnification which corresponds to the image height and the second wavelength; and estimating, by a position calculating procedure, for respective pixels corresponding to the reference wavelength, an amount of displacement of an image location due to a distortion by using an equation expressing a relationship between an amount of distortion at the image height and the amount of displacement, and estimating, for respective pixels corresponding to the first wavelength and the second wavelength, an amount of displacement of an image location due to a distortion including a correction of chromatic aberration of magnification by replacing the amount of distortion in the equation with the amount of distortion corrected by the aberration correcting procedure for the first wavelength and the second wavelength.

7. The image processing device according to claim 1, wherein the aberration correcting unit obtains (1) the amount of distortion including the chromatic aberration of magnification for the first wavelength by obtaining the correction value for the first wavelength as a product of a coefficient determined by a rate of magnification conversion applied to an image after distortion correction and the difference of the rate of magnification conversion due to the chromatic aberration of magnification and subtracting the correction value for the first wavelength from the amount of distortion of the reference wavelength, and (2) the amount of distortion including the chromatic aberration of magnification for the second wavelength by obtaining the correction value for the second wavelength as a product of the coefficient and the difference of the rate of magnification conversion and subtracting the correction value for the second wavelength from the amount of distortion of the reference wavelength.

* * * * *